United States Patent
Di Crescenzo et al.

(10) Patent No.: US 8,767,965 B2
(45) Date of Patent: Jul. 1, 2014

(54) METHOD FOR A PUBLIC-KEY INFRASTRUCTURE PROVIDING COMMUNICATION INTEGRITY AND ANONYMITY WHILE DETECTING MALICIOUS COMMUNICATION

(75) Inventors: Giovanni Di Crescenzo, Madison, NJ (US); Tao Zhang, Fort Lee, NJ (US); Robert G. White, Morristown, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 1294 days.

(21) Appl. No.: 12/175,807

(22) Filed: Jul. 18, 2008

(65) Prior Publication Data

US 2009/0046854 A1 Feb. 19, 2009

Related U.S. Application Data

(60) Provisional application No. 60/961,153, filed on Jul. 19, 2007.

(51) Int. Cl.
*H04L 9/06* (2006.01)
*H04L 9/08* (2006.01)

(52) U.S. Cl.
CPC ...... *H04L 9/0891* (2013.01); *G06F 2221/0771* (2013.01)
USPC .......................................... 380/277; 713/163

(58) Field of Classification Search
USPC ...................... 380/277–279, 44–47
See application file for complete search history.

(56) References Cited

U.S. PATENT DOCUMENTS

| | | | |
|---|---|---|---|
| 6,839,436 B1 | 1/2005 | Garay et al. | |
| 7,039,803 B2 | 5/2006 | Lotspiech et al. | |
| 7,234,058 B1* | 6/2007 | Baugher et al. | 713/163 |
| 2007/0033419 A1 | 2/2007 | Kocher et al. | |
| 2007/0223702 A1 | 9/2007 | Tengler et al. | |
| 2008/0046718 A1* | 2/2008 | Grab et al. | 713/156 |
| 2008/0148398 A1* | 6/2008 | Mezack et al. | 726/22 |

OTHER PUBLICATIONS

Canettti, Ran et al., "Multicast Security: A Taxonomy and Efficient Constructions," In Proceedings of INFOCOMM 1999, pp. 0-20.
Fiat, Amos et al., "Broadcast Encryption," in Proceedings of Crypto 1993, Lecture Notes in Computer Science, Springer-Verlag, pp. 0-12.

(Continued)

*Primary Examiner* — Gilberto Barron, Jr.
*Assistant Examiner* — David Le
(74) *Attorney, Agent, or Firm* — Philip J. Feig

(57) ABSTRACT

An inventive scheme for detecting parties responsible for repeated malicious activities in secure and anonymous communication is presented. The scheme comprises generating a pool of keys, distributing to and associating with each party a small number of keys chosen randomly from the pool, revoking a key when it is detected as used in a malicious activity, creating a set of parties associated with the revoked key, revoking additional keys randomly chosen among the keys not currently revoked, selecting new keys, and when a party requests an updated key, sending the updated key selected from among the new keys to the requesting party, wherein if an other malicious activity is detected, creating another set of the parties associated with the other malicious activity and identifying the parties in both sets. The steps of the inventive scheme are repeated until only one party is in the intersection set.

10 Claims, 2 Drawing Sheets

(56) References Cited

OTHER PUBLICATIONS

Chaum, David et al., "Group Signatures," in Proceedings of Eurocrypt 1991, Lecture Notes in Computer Science, Springer-Verlag, pp. 257-265.

Rivest, Ronald L. et al., "How to Leak a Secret," In Proceedings of Asiacrypt 2001, Lecture Notes in Computer Science, Springer-Verlag, pp. 1-13.

Eschenauer, Laurent et al., "A Key-Management Scheme for Distributed Sensor Networks," In Proceedings of the 9th ACM Conference on Computer and Communications Security, Nov. 2002, pp. 1-7.

Garay, Juan A. et al., "Long-Lived Broadcast Encryption," In Proceedings of Crypto 2000, Lectures Notes in Computer Science, Springer Verlag, pp. 1-19.

Herzberg, A. "DIMACS Security & Cryptography Crash Course—Day 3 Resiliency to Corruptions and Key Exposures," http://dimacs.rutgers.edu/Workshops/ComputerSecurity/slides/d3_resiliency.pdf, Jul. 23, 2003, p. 1-70.

International Search Report, dated Oct. 7, 2008 (2 pages).

PowerPoint presentation: Herzberg, A. "DIMACS Securtiy & Cryptography Crash Course—Day 3 resiliency to Corruptions and Key Exposures"[online], Jul. 23, 2003, p. 1-70.

International Search Report, dated Oct. 7, 2008.

\* cited by examiner

METHOD FOR A PUBLIC-KEY INFRASTRUCTURE PROVIDING COMMUNICATION INTEGRITY AND ANONYMITY WHILE DETECTING MALICIOUS COMMUNICATION

CROSS REFERENCE TO RELATED APPLICATION

The present invention claims the benefit of U.S. provisional patent application 60/961,153 filed Jul. 19, 2007, the entire contents and disclosure of which is incorporated herein by reference.

This application is related to commonly-owned, co-pending U.S. patent application Ser. Nos. 12/051,241 and 12/051,309, each filed on Mar. 19, 2008, the entire contents and disclosure of which is expressly incorporated by reference as if fully set forth herein.

FIELD OF THE INVENTION

The present invention relates generally to cryptography and security. In particular, the invention relates to public key infrastructures that allow parties to digitally sign their messages (from now on, also called signature key infrastructures) and to detect, in a secure and anonymous system, parties responsible for repeated malicious activity.

BACKGROUND OF THE INVENTION

Consider a large scale network where parties or participants exchange secure communication using cryptographic keys and certificates. Three major requirements for such secure network communication are communication integrity protection, anonymity of honest participants and traceability of misbehaving participants. Communication integrity protection can be achieved appending to each message a digital signature. When a given signed message might have been produced by all or many of the parties in the infrastructure, each party is virtually anonymous. Traceability refers to the ability to find which participants produced a given malicious signed message.

Such secure communications can occur where each pair of key and certificate that may be used is actually shared by a large number of parties. While such key sharing strategies may guarantee satisfactory levels of anonymity, they automatically make it hard to trace or identify any party that, while using pairs of cryptographic keys and certificates, delivers messages containing malicious activity. Hence, a major problem with this scheme relates to the traceability requirement. This is especially important in the case of repeated malicious activity from these parties, where re-keying the keys associated with malicious activity does not seem to help in solving the problem, as the attacker or malicious party is allowed to continue malicious activity with the newly obtained key and still remain undetected.

For example, if the attacker sends a single malicious message, then the attacker can be traced at best as one of the group of clients or participants that share the attacking key. However, this group contains, on average, the total number of participants times the total number of groups, divided by the number of members of a group, so that the group can be very large, especially if the number of participants is very large. Accordingly, this traceability strategy is not really effective. Even worse, in typical attacks consisting of several malicious messages, an attacker can decide to use the following strategy: first, it uses an arbitrary signature key to send the first malicious message; afterwards, this message is detected to be malicious, so that the arbitrary signature key is revoked and replaced with a fresh one. Then, the attacker will attack again using precisely the fresh signature key because the attacker is not obliged to randomly choose the verification key to obtain the next attacking message. The result is that the traceability does not improve and the attacker will be able to send several attacking messages without increasing its already low traceability.

The solution in the prior art to detecting malicious parties in secure communications requires eliminating the anonymity of each party in the system. Previously studied and somewhat related models of this problem include broadcast or multicast encryption (see, e.g., R. Canetti, J. Garay, G. Itkis, D. Micciancio, M. Naor and B. Pinkas, *Multicast Security: A Taxonomy and Efficient Authentication*, in Proc. of Infocomm 1999, and A. Fiat and M. Naor, *Broadcast Encryption*, in Proc. Of Crypto 1993, LNCS, Springer-Verlag.), group signatures (introduced in D. Chaum and E. van Heist, *Group Signatures*, in Proc. of Eurocrypt 1991, LNCS, Springer-Verlag.) and ring signatures (introduced in R. Rivest, A. Shamir, and Y. Tauman, *How to leak a secret*, in Proc. of Asiacrypt 2001, LNCS, Springer-Verlag.). Other variations proposed and analyzed by several research groups, such as J. Garay, J. Staddon, and A. Wool, *Long-live Broadcast Encryption*, in Proc. of CRYPTO 2000, LNCS, Springer-Verlag., L. Eschenauer and V. D. Gligor, *A Key-Management Scheme For Distributed Sensor Networks*, in Proc. of ACM, and S. Tengler, S. Andrews, and R. Heft, *Digital Certificate Pool*, U.S. Patent Application Publication No. 2007/0223702, also illustrate various contexts and models, but do not effectively achieve anonymity and traceability.

Another studied area in the cryptography and software protection literature is called "Traitor Tracing", which does guarantee distribution of "valid" keys to parties in a way that if some "traitors" help a new unauthorized party to come up with a valid key, then one of the "traitors" is detected. However, this key distribution strategy does not guarantee any anonymity to the parties.

Accordingly, a method that allows the parties to achieve and maintain the same satisfactory level of anonymity and yet allows an authority to detect which parties are responsible for sending messages with malicious activity is needed.

BRIEF SUMMARY OF THE INVENTION

The present invention relates to signature key infrastructures and advantageously provides a method for guaranteeing the detection of malicious parties in the context of secure anonymous communication, by appropriate re-keying strategies that properly randomize the set of candidate malicious parties, so that repeated malicious activity becomes noticeable, and yet anonymity is not sacrificed. The inventive method can be used in a product manufactured for communications in any network enabling certified messaging.

The inventive method for a signature key infrastructure enabling detection of malicious parties responsible for repeated malicious activities in secure and anonymous communication among a plurality of parties comprises steps of generating a pool of keys using a key-generation algorithm, distributing to and associating with each party of the plurality of parties a small number of keys chosen randomly from the pool of keys, revoking a key of the chosen keys when the key is detected as used in a malicious activity, and creating a first set of parties associated with the revoked key, revoking additional keys that are randomly chosen among the keys of the pool that are not currently revoked, and selecting new keys randomly and independently generated using the key-generation algorithm, and when a party requests an updated key, sending the updated key selected from among the new keys to the requesting party, wherein if an other malicious activity is detected, creating a second set of the parties associated with a malicious activity key of the other malicious activity and identifying the parties in both the first set and the second set.

BRIEF DESCRIPTION OF THE DRAWINGS

The invention is further described in the detailed description that follows, by reference to the noted drawings by way of non-limiting, illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

Figure 1:
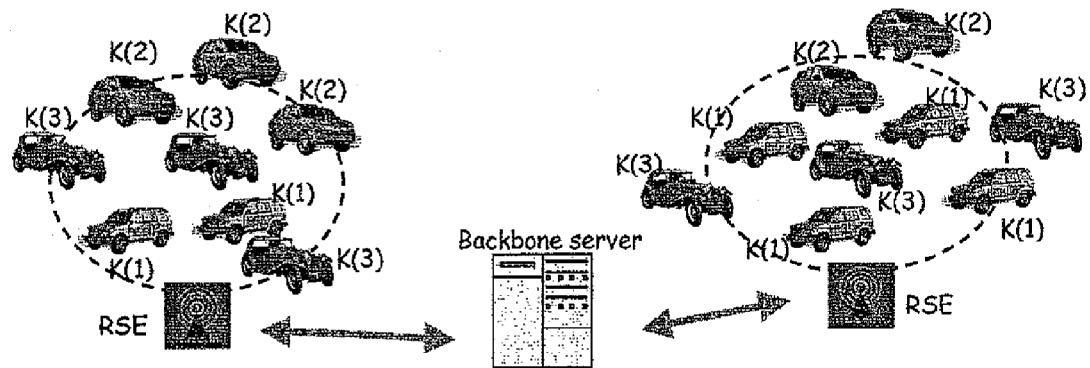
FIG. 1 is a schematic diagram of an exemplary network before execution of the inventive scheme.

A signature key infrastructure, based on key pools and a probabilistic re-keying strategy, simultaneously achieves satisfactory anonymity and traceability properties. Our novel probabilistic revocation and update procedure bypasses the apparent impossibility of reconciling anonymity and traceability by using revocation. A rekeying strategy reduces the number of candidates, and this process can continue until the number of candidates is equal to the number of malicious parties.

In support of this re-keying strategy, a novel formal model is presented for signature key infrastructures, as composed of message signing, signature verification, malicious key detection, and malicious key tracing algorithms, and of key management protocols in the events of starting, joining, and leaving the infrastructure, and updating a key. For these infrastructures, requirements of correctness, anonymity and traceability are formally defined.

Specifically, we especially target a stronger version of anonymity, called full anonymity, where no secrets held by the trusted server are hidden to the adversary, and a special localized signing property according to which each client should be able to produce a signature without knowing how many participants or clients participate in the system or which keys they possess. The full anonymity is of interest to those in a very large network who desire to safeguard their privacy against more powerful entities that may want to violate it for their own interests. Moreover, the localized signing property is appropriate to networks in which a client may not want to contact or know about other clients before producing his or her own signed messages. Because of these two special properties, one can see that other well-studied models and solutions such as those for broadcast or multicast encryption, group signatures and ring signatures, do not solve our problem. On the other hand, in designing our schemes, we consider anonymity among a large enough number of clients (as opposed to among all of them) to be satisfactory, as we expect the set of clients to be very large in many applications.

A conventional public-key infrastructure, focused exclusively on public keys for signature schemes is presented. Such infrastructures are also denoted as signature key infrastructures and such keys as signature keys. We assume familiarity with the digital signature schemes, as defined in the cryptography literature, and with the various notions associated with public-key infrastructures, such as certificates, certificate revocation, certificate authority and certificate revocation list. Further, we assume that a signature key is always used along with its associated certificate and some data claiming knowledge of the associated secret key, such as a signature of a nonce or a timestamp. Accordingly, to simplify the discussion, we will only talk about signature keys, and will not mention the attached certificates.

In secure network communications, keys are generally generated using a key-generation algorithm. According to the inventive re-keying strategy, whenever a key k is revoked, the backbone server, also called a certificate authority or CA, responsible for the re-keying strategy will also choose to revoke c (number-c) additional keys $k(1), \ldots, k(c)$, that are randomly chosen among the keys that are in the current version of the pool and that are not currently revoked, for some small integer c greater than or equal to one ($c>=1$). Note that choosing a small c is only relevant with respect to performance evaluation. Furthermore, the CA selects one more than c (c+1) (number-c1) new keys $k', k'(1), \ldots, k'(c)$, randomly and independently generated using the key-generation algorithm, and designates these keys to replace the revoked keys in the scheme structure. Later, upon receiving a party's request to update either key k or one of the additional c revoked keys k(i), the CA will update any of these keys by using the following probabilistic modification with respect to the previous strategy. The CA randomly and independently chooses one among the new keys $k', k'(1), \ldots, k'(c)$, and sends this chosen key as the new key to the parties who requested it. This re-keying process can continue until the number of candidates is equal to the number of malicious parties, so that the malicious attacker is identified.

The first property of this key-update procedure is that the various distributions involved in the key management scheme remain unchanged. Most notably, this is the case for the distribution of the keys given to any parties in the scheme and for the distribution of the keys in the pool. More precisely, the above strategy maintains the following invariants: 1) at any time, the pool of keys from which the keys to be distributed to the parties are chosen contains N keys that are randomly and independently chosen according to the associated key-generation algorithm; 2) every party is given and associated with n keys uniformly and independently distributed from the set of keys that are in the current, i.e., updated, version of the N-sized key pool. We note that these invariants maintained by the above strategy are very important to preserve the analysis of the various performance metrics associated with the key management scheme even after multiple revocations of keys, and thus throughout the lifetime of the scheme.

The second property of this key-update strategy is that it helps in discovering which party is responsible for repeatedly malicious behavior much more quickly than, for example, interrogating all candidate parties. More formally, assume that one particular party uses one of its anonymous keys k for some malicious activity that is detected. As a consequence, the key k as well as additional keys $k(1), \ldots, k(c)$ are revoked; in this moment, it is hard to detect which party generated the maliciously prepared message as several parties were assigned key k and thus any one of them had potentially acted maliciously. However, unlike before, not all parties that previously shared key k receive the same new key k' upon completion of their update request, as each of them may receive any of the additional new keys k'(i) with some probability. Now, if the previously malicious party continues its malicious activity using the new key k', thus forcing this new key to be revoked again, the set S(k') of parties that share k' with the malicious party is largely different from the set S(k) of parties that previously shared k with the malicious party. As a result, the malicious party can be identified to be one of the parties in the intersection of the two sets S(k), S(k'). Moreover, this intersection effect will continue indefinitely in the presence of repeated malicious activity, until a single party is detected to be the one that had acted maliciously. More formally, we note that due to the random re-keying assignment procedure for key k' and for the c keys k'(1), . . . , k'(c) additionally revoked together with key k, the set of parties that are potential originators of the repeated malicious activity decreases by a multiplicative factor equal to 1/(c+1) after every round of key updates from the server or CA. Here, a "round of key updates" is the worst-case assumption that the CA updates all parties that share the key k used during the malicious activity. Since the original set of potentially malicious parties had large average size, say equal to q, the malicious party will be detected within a number of rounds of key updates equal on average to log q/log(c+1), where logarithms are in base 2. This is significantly better than interrogating all q parties.

Figure 2:
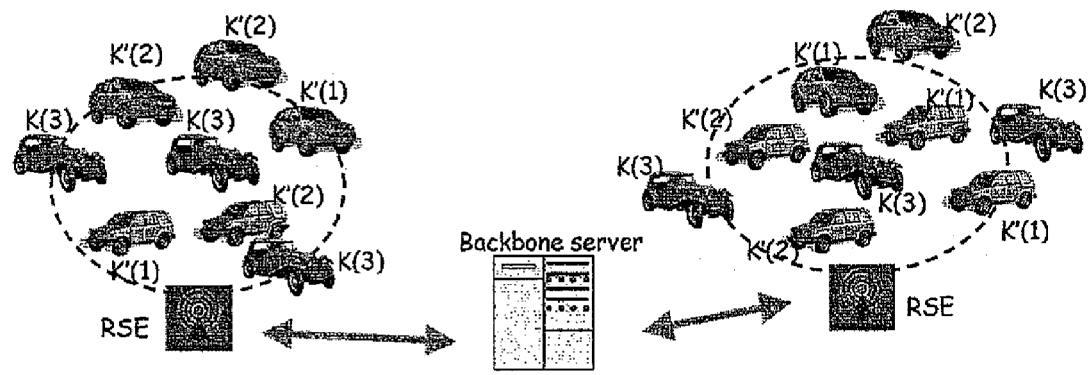
FIG. 2 is a schematic diagram of an exemplary network after an execution of the inventive scheme.

FIGS. 1 and 2 illustrate the inventive scheme implemented with vehicles as clients. FIG. 1 shows two client regions. The region on the left has eight vehicles or clients, while the region on the right has nine. Each vehicle in each region has a key of either K(1), K(2), or K(3). Assume that one of the vehicles, called the malicious vehicle, has key K(1) and sends a malicious message. Note that there are six vehicles shown in FIG. 1 having K(1) as their key. The inventive scheme is implemented so that key K(1) is revoked and some vehicles get new key K'(1). FIG. 2 shows the same regions and vehicles after implementation of the inventive scheme. Assume that the same malicious vehicle continues to send malicious messages using K'(1). There are only three vehicles that originally had K(1) and now have K'(1) as their key, and the malicious vehicle is one of these three. The scheme is repeated to determine precisely the malicious vehicle.

Figure 3:
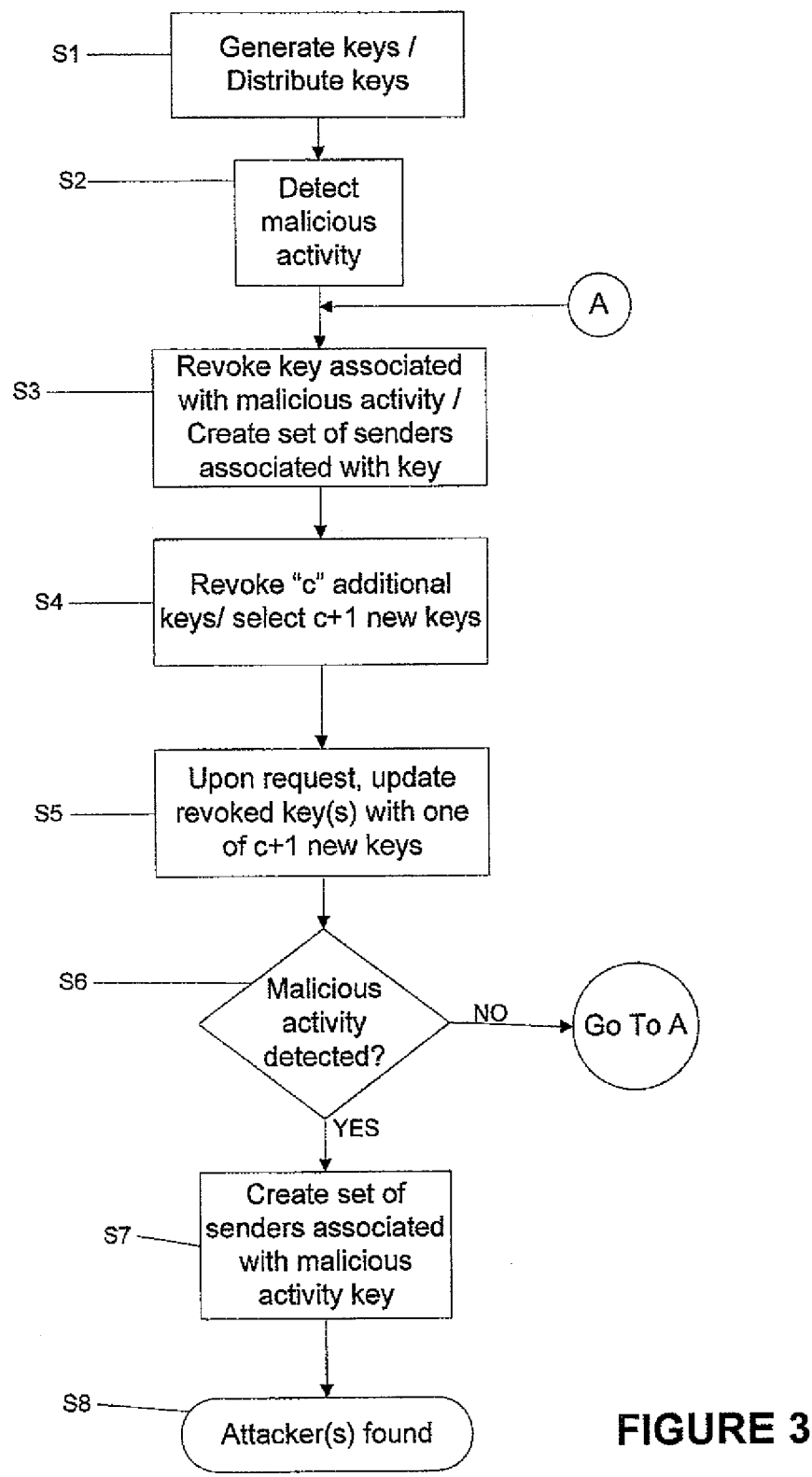
FIG. 3 is a flow diagram of an exemplary embodiment.

FIG. 3 is a flow diagram illustrating the flow of the inventive scheme. Initially, in step S1, keys are generated using a key-generation algorithm. Next, a malicious message is detected in step S2. In step S3, the key associated with the sender of the malicious message or attacker is revoked, and a first set of senders having the key associated with the malicious message is created. In step S4, c additional keys are revoked, and c+1 new keys are selected, and one new key is sent to the sender of the malicious message. When another user of a revoked key requests a new key, in step S5, the key for this user is updated.

When another malicious message is detected (S6=YES), the attacker may be determinable based on the series of keys revoked and issued. In step S7, a second set of senders associated with this additional malicious message is created. The attacker(s) are identified in step S8 based on the intersection of the first and second sets.

Otherwise (S6=NO), the process resumes at step S3, wherein the key associated with the attacker is revoked along with additional keys, new keys are selected, and a new key is sent to the sender of the malicious message.

An exemplary communications network is a vehicular network. In one commonly envisioned scenario, all vehicles allow roadside servers to collect very frequent, signed messages, from all vehicles, containing traffic statistics or notifications that can be very useful for public safety. While this is done, it is of clear interest both to protect the anonymity of vehicle owners providing their own traffic statistics and to find which vehicles sent malicious messages attempting to disrupt traffic conditions or even traffic safety itself. Moreover, as random IP addresses and randomly rotating MAC addresses are frequently advocated in such communications, guaranteeing anonymity and traceability of such traffic data heavily depends on doing so over the keys used within the signature key infrastructure.

A more formal description of the inventive scheme is now presented. We consider a server S that models a number of entities performing the role of a certification authority, and multiple clients, denoted as $C_1$, $C_2$, . . . , whose number, denoted as ν, may increase and decrease over time. Each client can communicate with the server to join or leave the infrastructure, and the server can broadcast to all clients the (current) key revocation list. Also, clients can use their signature keys for any client-to-client and client-to-server communication. We consider a model where updates of signature keys that have been revoked may be frequent and are requested from each client to S (this fits well our motivating scenario of vehicular networks) as opposed to the model where S broadcasts updates to all clients (used, for instance, in the broadcast/multicast encryption research area).

Signature Key Infrastructures Model.

We formally define a signature key infrastructure as a tuple of eight algorithms or subprotocols. First, we have two algorithms that are semantically equivalent (but syntactically different) to analogous algorithms traditionally used in the definition of digital signature schemes: a message signing algorithm, and a signature verification algorithm. Then, we have a malicious key detection algorithm, and a key tracing algorithm. Finally, we have four subprotocols, each defined as an event-key management subprotocol, for event=start, join, leave, and revoke. We now describe their syntax and semantics.

The message signing algorithm SIGN is run by each client to protect communication integrity. On input of a security parameter λ in unary, a public file pF, a secret file sF, and a message m, algorithm SIGN returns a signature sig. The signature verification algorithm VER is run by each client to verify the integrity of the received communication, that is, a security parameter λ in unary, a message m and a signature sig are input and algorithm VER returns 1, meaning that sig is a valid signature, or 0 otherwise. The use of public and/or secret files rather than specific keys in the syntax of the message signing algorithm and the lack of specific public keys in the syntax of the signature verification algorithm are motivated by our anonymity goals for such schemes.

The malicious key detection algorithm DET is an algorithm that allows one to detect whether a given message signed using a signature public key is malicious or not. It is assumed that such an algorithm is available to the server, and that no further definition of what is malicious or which methods are used for detection is needed as it depends on the application at hand. Formally, on input of a message m and a signature sig, algorithm DET returns 1, meaning that this is a malicious message, or 0 otherwise.

The key tracing algorithm KTR is an algorithm that attempts to detect whether a given client might have used a given malicious communication transcript along with its signature public key. Formally, on input of the server's database dtb, an index j, a parameter q, a communication transcript tr equal to q message/signature pairs $(m_i, sig_i)$, algorithm KTR returns a string in {yes, no} denoting whether client Cj, for some j in {1, . . . , ν}, might have generated this transcript or not. Note that if KTR returns no, then we are sure that client Cj did not generate such transcript; however, if KTR returns yes, then we can at most infer that such transcript was generated by one of the clients Cj for which KTR(P, dtb, m, sig, j) returns yes.

For event=start, and/or event=revoke, the event-key management subprotocol is run on the server to generate the server's database dtb or to update the server and clients information when revoking a key, respectively. On input of the current server's database dtb, the current key revocation list krl, and the event type event in {start, revoke}, protocol KM returns pair ($out_C$, $out_S$), where $out_C$ are updated clients' values and $out_S$ are updated S's values. In the case of event=start, $out_C$=krl and $out_S$=(dtb, krl). In the case of event=revoke, $out_C$=({($pF_j$, $sF_j$)}$_{j\ in\ [\nu]}$, krl) and $out_S$=(dtb, krl), where krl has been updated by adding any keys revoked as a result of this revoke operation.

For event=Join, and/or event=leave, the event-key management subprotocol is run between the server and a client that is joining or leaving, respectively. On input of the identity $ID_i$ of client $C_i$, the current server's database dtb, the current key revocation list krl, and the event type event in {join, leave}, protocol KM returns pair ($out_C$, $out_S$), where $out_C$ are updated clients' values and $out_S$ are updated S's values. In the case of event=join, $out_C$=($pF_i$, $sF_i$, krl) and $out_S$=(dtb, krl), where dtb has been updated by adding record (join; i; $pF_i$, $sF_i$), and krl has been updated by adding any keys revoked as a result of this join operation. In the case of event=leave, $out_C$="nothing" and $out_S$=(dtb, krl), where dtb has been updated by adding record (leave; i; $pF_i$, $sF_i$) and krl has been updated by adding any keys revoked as a result of this leave operation (e.g., all keys previously distributed to client $ID_i$).

Here, dtb denotes the database that is initialized at the start and later updated by the server to perform future operations, containing, among other things, the identities of all clients, and their public and secret signature keys. Also, $pF_i$, $sF_i$ denote public and secret files (i.e., sets of keys) that are given to the i-th client, and krl denotes the key revocation list that is assumed to be known at any time to all clients.

A signature key infrastructure or SKI is denoted as a 5-tuple (KM, SIGN, VER, DET, KTR) of probabilistic algorithms or subprotocols where KM=($KM_{start}$, $KM_{join}$, $KM_{leave}$, $KM_{update}$). A formal description of SKI configuration is provided below. For simplicity, it is assumed that an execution of SKI can have a preliminary phase, called the setup phase, where the server runs the $KM_{start}$ algorithm, and afterwards can have up to four concurrent phases: a joining phase, where a client and the server run the $KM_{join}$ algorithm; a normal use phase, where clients run the SIGN and VER algorithms and the server runs the DET and KTR algorithms; a revocation phase, where a client and the server run the $KM_{update}$ algorithm; and a leaving phase, where a client and the server run the $KM_{leave}$ algorithm. We denote as p the list of parameters (in unary) associated with SKI, that can be any subset among: the number of clients ν, and the security parameter λ, which have been defined above, and the number of keys per client n, which will be defined below. All algorithms and subprotocols run in time polynomial in λ.

Verification Correctness Requirements.

A first basic requirement for a signature key infrastructure is that, at any time, a signature computed using one of the keys obtained during the joining phase is correctly verified by the verification algorithm. More specifically, the formal definition (provided below) of this requirement states that the following happens with probability 1. First, the database dtb and the key revocation list krl are initialized using algorithm $KM_{start}$ on input parameters p. Then a user with identity $ID_i$ joins the group by running the protocol $KM_{join}$ with the server, the protocol having input parameters p, identity $ID_i$, database dtb and key revocation list krl, and returning a new pair of public and private key files ($pF_i$, $sF_i$) for the client and a new database dtb and key revocation list krl for the server. Finally, the user computes a signature sig using algorithm SIGN with input $1^\lambda$, $pF_i$, $sF_i$ and a message m. It is required that for any $ID_i$, krl, m, the verification algorithm VER, with input $1^\lambda$, m, sig, returns 1 (meaning that the signature is correctly verified).

Traceability Correctness Requirement.

A second basic requirement for a signature key infrastructure is that, at any time, a signature computed using one of the keys obtained during the joining phase is correctly linked to its signer by the key tracing algorithm. More specifically, the formal definition (provided below) of this requirement states that, under the same probabilistic experiment defined in the verification correctness requirement, for any $ID_i$, krl, m, the traceability algorithm KTR, with input p, dtb, m, sig, i, returns 1 (meaning that the user with identity $ID_i$ is a potential originator of signature sig for message m).

Formally, these two requirements can be defined as follows.

Definition 1. Let SKI=(KM, SGN, VER, DET, KTR) be a signature key infrastructure with parameters $\not{p} = (\lambda, \nu)$, where KM=(KMstart, KMjoin, KMleave, KMupdate). The correctness requirements for SKI are:

Verification correctness: for each i in {1, ..., ν}, and any strings $ID_i$,krl,m:

$$Prob[(dtb, krl) \leftarrow KMstart(\not{p});$$
$$((pFi, sFi), (dtb, krl)) \leftarrow KMjoin(\not{p}, IDi, dtb, krl);$$
$$sig \leftarrow SIGN(1^\lambda, pFi, sFi, m) : VER(1^\lambda, m, sig) = 1] = 1.$$

Traceability correctness: for each i in [1, ..., ν], and any strings IDi,krl,m:

$$Prob[(dtb, krl) \leftarrow KMstart(\not{p});$$
$$((pFi, sFi), (dtb, krl)) \leftarrow KMjoin(\not{p}, IDi, dtb, krl);$$
$$sig \leftarrow SIGN(1^\lambda, pFi, sFi, m) : KTR(\not{p}, dtb, m, sig, i) = yes] = 1.$$

Note that algorithms VER and SIGN are not given parameter ν as input to model the fact that clients may not be aware of the number of total clients in the system, which is the case in our motivating scenario of vehicular networks.

The Anonymity Requirement

In accordance with our anonymity requirement, any given valid signature can be associated with the client that issued it only with small probability. Contrary to previous notions such as group signatures, this requirement holds even if the anonymity attacker is given the same information that the server has (i.e., the server's database dtb). The possibility of an attacker somehow obtaining the server's private information is acknowledged, while no assumption regarding the trustworthiness of the server is made.

The anonymity attack probability experiment underlying our anonymity requirement can be informally described as follows. As in all anonymity requirements, the adversary's goal is trying to figure out which client, among a subset of clients chosen by the adversary, has used a particular public key to sign a message. In the probabilistic experiment, this is formalized with the following steps. After the server's database dtb is generated, the adversary can use dtb to generate a c-size subset Candidates denoting a set of candidate clients, and an r-size subset Corrupted denoting a set of corrupted clients. The values of c, r are not restricted, enabling, for example, both greater generality and better capture of the most practical vehicular network scenarios having large values for c. Then value i (denoting client $ID_i$) is randomly chosen from Candidates. Then the adversary can adaptively perform q query requests, each query resulting in one among the following: a client joining (resulting in an execution of protocol $KM_{join}$); a client leaving (resulting in an execution of protocol $KM_{leave}$); a key being revoked (resulting in an execution of protocol $KM_{revoke}$, where the number of such executions is bounded by a parameter r); a signature being produced by a randomly chosen client using algorithm SIGN, to model eavesdropping activity; and a signature being produced by the client $ID_i$ using algorithm SIGN, as modeled in the standard chosen-message attack for signature schemes. After gathering data resulting from all these q queries, the adversary outputs j and is successful if j=i (i.e., the adversary guessed the unknown signer's identity). We say that signature key infrastructure SKI is α-anonymous (against a q-query, c-candidate, r-corruption attack) if for any polynomial-time algorithm A, and all user identities, the SKI holds that the probability, in the above probabilistic experiment, that the adversary is successful is less than or equal to α+1/c. (Note that since there are c candidates, an adversary randomly choosing a candidate is always successful with probability 1/c.) A formal definition can be found below.

Definition 2. Let SKI=(KM, SIGN, VER, DET, KTR) be a signature key infrastructure with parameters $\wp =(\lambda, v)$, where KM=(KMstart,KMjoin,KMleave,KMupdate). For any α in [0,1] c,r in $\{1, \ldots, v\}$, and any positive integer q, we say that SKI is α-anonymous (against a q-query, c-candidate, r-corruption attack) if for any polynomial-time algorithm A, all distinct identities $ID_1, \ldots, ID_v$, it holds that the probability that experiment $FAnonExp^{SKI,A}(\wp, q, c, r, \{ID_i\}_{vi=1})$ returns 1 is $\leq \alpha+1/c$, where $FAnonExp^{SKI,A}$ is defined as follows:

adversary, whose goal will then be to let a signature be traced to one of the uncorrupted clients. This requirement is semantically equivalent to the traceability requirement for previous notions, including group signatures. In fact, a somewhat different experiment definition can be used, where the adversary wins if a client that is randomly chosen among those to which the malicious message/signature pair can be traced, is also not in the set of clients corrupted by the adversary. An adversary can generate multiple message/signature pairs during its attack experiment, each possibly followed by a key update procedure, in case the message produced is malicious. Moreover, each signature is possibly followed by a key revocation and update procedure, in case the signature is associated with a malicious message. As for the anonymity requirement, for greater generality, the adversary can choose the actual sequence of join, leave, or attack events happening in the signature key infrastructure lifetime.

In the probabilistic experiment, this is formalized with the following steps. After the server's database dtb is generated, the adversary can use dtb to generate an r-size subset Corrupted denoting a set of corrupted clients. Then, as in the anonymity experiment, the adversary can adaptively perform q query requests, each query resulting in one among the following: a client joining (resulting in an execution of protocol $KM_{join}$); a client leaving (resulting in an execution of protocol $KM_{leave}$); a key being revoked (resulting in an execution of protocol $KM_{revoke}$, where the number of such executions is bounded by a parameter r); and an attack query, where the adversary generates a message/signature pair which, if detected to be malicious, triggers a key revocation procedure, via protocol $KM_{revoke}$. After gathering data resulting from all these q queries, the adversary outputs j and is successful if j=i (i.e., the adversary guessed the unknown signer's identity).

---

$FAnonExp^{SKI,A}(\wp, q, c, r, \{ID_i\}^v_{i=1})$
1. (dtb,krl) ← KMstart($\wp, \{ID_i\}^v_{i=1}$)
2. ct ← 0
3. (Corrupted,Candidates,aux) ← A($\wp$, c,r,dtb, krl)
4. i ← Candidates
5. repeat
    ct ← ct + 1
    (query,aux) = A($\wp$,dtb,krl, aux)
    if query = (join, IDv) then
        set v ← v+1, ((pFv,sFv,krl);(dtb,krl))←KMjoin($\wp$,IDv ,dtb,krl)
    if query = (leave,h) then set (dtb, krl) ← KMleave($\wp$, IDh, dtb,krl) and v ← v −1
    if query = (revoke, vk) and vk is in pFi for some i in Corrupted then
        set (({pFj, sFj}j in [v], krl); (dtb, krl)) ← KMrevoke($\wp$, dtb, krl; vk)
    if query = (sign, mct, h) then set sigct ← SIGN($1^\lambda$, pFh,sFh,mct)
    if query = (attack, mct) then set sigct ← SIGN($1^\lambda$, pFi,sFi,mct)
until ct = q
6. j ← A($\wp$, dtb,krl ,aux)
7. if Candidates ⊆ [v], Corrupted ⊆ [v], |Candidates| = c, |Corrupted| = r then
if j = i and Candidates ∩ Corrupted = "emptyset" then return: 1 else return: 0.

---

Note that a natural goal for a signature key infrastructure would be that to satisfy α-anonymity for a negligible in both λ and v. However, schemes that satisfy α negligible in both λ and subpolynomial in v are also of interest, given that in "practical" or typical vehicular networks, v is expected to be much larger than λ (e.g., for a U.S. vehicular network: $v>10^8>>\lambda=1024$).

The Traceability Requirement

Our traceability requirement enables any given valid signature of a malicious message to be traced to the client that issued it except with small probability. The actual formalization has to take into account the corruption capability of the Signature key infrastructure SKI is τ-traceable (in a q-query, c-candidate, r-corruption attack) if for any polynomial-time algorithm A and all user identities, it holds that the probability, in the above probabilistic experiment, that the adversary is successful is less than or equal to τ. A formal definition can be found below.

Definition 3. Let SKI (KM, SIGN, VER, DET, KTR), be a signature key infrastructure with parameters $\wp =(\lambda, v)$, where KM=(KMstart, KMjoin, KMleave, KMrevoke), For any τ in [0, 1] and any c in $\{0,t\}$, we say that SKI is τ-traceable in a q-query, c-candidate, r-corruption attack if for any polynomial-time algorithm A and for all distinct identities $ID_1, \ldots, ID_v$, it holds that the probability that the experiment $\text{FTrExp}^{SKI,A,c}(\wp,q,c,r,\{IDi\}_{i=1}^{v})$ returns 1 is $\tau$, where experiment FTrExp is defined as follows:

$\text{FTrExp}^{SKI,A,c}(\wp,q,c,r,\{IDi\}_{i=1}^{v})$
1. (dtb,krl) ← KMstart($\wp,\{IDi\}_{i=1}^{v}$)
2. (Corrupted,aux) ← A($\wp$, c,r,dtb, krl)
3. ct ← 0
4. repeat
    ct ← ct + 1
    (query, aux) = A($\wp$, dtb, krl)
    if query = (join,IDv) then
        set v←v+1, ((pFv,sFv,krl); (dtb,krl)) ← KMjoin($\wp$,IDv,dtb,krl)
    if query = (leave,h) then set (dtb, krl) ← KMleave($\wp$,IDv,dtb,krl) and v ← v −1
    if query =(revoke,vk) then
        set ((\{(pFj, sFj)\}j in [v] ,krl);(dtb,krl))←KMrevoke($\wp$,dtb,krl;vk)
    if query = attack then
        (mct, sigct) ← A($\wp,\{sFz\}$z in s)
        if DET(mct,sigct) = 1 then
            ((\{pFi, sFi\}i in [v] ,krl); (dtb, krl)) ← KMrevoke($\wp$,dtb,krl;vk)
until ct = q
5. for i = 1,... ,v;
    let Qi = \{d : d is in [ct] , VER(md,sigd) = DET(md,sigd) = 1 ,KTR($\wp$, dtb,md , sigd,i) =yes\},
6. randomly choose j in [v] among values for which |Qj | is maximized
7. if Corrupted ⊆ [v], | Corrupted| = r, and j is not in Corrupted then return: 1 else return: 0.

Note that a natural goal for a signature key infrastructure would be to satisfy $\tau$-traceability for $\tau$ negligible in both $\lambda$ and $v$. However, as with the anonymity requirement, schemes for which $\tau$ is negligible in $\lambda$ and subpolynomial in $v$ are also of interest.

SKI Construction

Initially, an informal description of the ideas behind our signature key infrastructure SKI is presented, followed by its formal description and a showing of its correctness, anonymity and traceability properties.

Informal Description of SKI Construction.

Preliminary attempts to achieve full anonymity quickly rule out techniques, such as those used in group signatures, that are based on secret information held by trusted servers. Instead, in our full anonymity experiment, such secret information can also be given to the adversary. Key distribution approaches based on shared pairs of public and secret signature keys are considered. In particular, we note that simple key distribution approaches appear to satisfy either anonymity or traceability but never both; for instance, the approach of distributing the same key pair to all users would satisfy full anonymity but not traceability, while the approach of distributing distinct key pairs to all users would satisfy traceability but not full anonymity.

Perhaps the simplest interesting variation is a scheme where a server generates a pool of N certified pairs of signature public and secret keys, and distributes to each joining client a small and randomly chosen subset of n pairs of keys from the pool. Such a scheme could provide satisfactory anonymity in our model even against an adversary who has access to the server database. Specifically, a client randomly choosing one of its n signature keys to sign a message would remain anonymous among the other clients that share the same key, which is, on average, $vN/n$. This number may be large enough for "practical" anonymity requirements, that is, those situations in which $v$ is expected to be a very large number, such as the total number of vehicles in a nation, and n, N are parameters chosen by the protocol designer.

The main problems with this scheme are with respect to the traceability requirement. First of all, if the attacker sends a single malicious message, then the attacker can be traced at best as one of the (on average) $vN/n$ clients that share the attacking key (where, again, we notice that $vN/n$ can be very large, thus implying that this traceability strategy is not really effective). Even worse, in typical attacks consisting of several malicious messages, an attacker can decide to use the following strategy: first, it uses an arbitrary signature key $vk_1$ to send the first malicious message; afterwards, this message is detected to be malicious, so that the related key is revoked and replaced with a fresh one $vk_2$; then, the attacker will attack again using precisely signature key $vk_2$ because the attacker is not obliged to randomly choose the verification key to obtain the next attacking message. The result is that the traceability does not improve and the attacker will be able to send several attacking message without increasing its already low traceability.

The inventive method presented herein combines the above scheme with a probabilistic key revocation and update technique that performs a small randomization of the assignment of keys to clients at each key revocation operation. This randomization defeats any deterministic structure in the key assignment derived from the server's database, and plays a different but important role in both proofs of the scheme's anonymity and traceability. The events of a client leaving the infrastructure or a client sending malicious messages trigger a key revocation procedure. In the first phase of the inventive scheme, all of the client's keys are revoked and added to the certificate revocation list and replaced from fresh new key pairs in the key pool. In the second phase, a probabilistic key revocation and update procedure is executed by the server. Specifically, not only is the key associated with malicious messages revoked, but also a few other keys randomly chosen from the pool are also revoked. All revoked keys, including the revoked keys in the pool, are then replaced by an equal number of new, randomly chosen keys. A client updating one of his revoked keys is then given a fresh key, randomly chosen among the set of new keys. Note that this technique guarantees that the scheme's distributions are preserved even after multiple key revocation and update events.

A Formal Description of SKI Construction.

The signature key infrastructure SKI is denoted as a 5-tuple (KM, SIGN, VER, DET, KTR) of probabilistic algorithms or subprotocols where KM=(KM$_{start}$, KM$_{join}$, KM$_{leave}$, KM$_{revoke}$). These algorithms and subprotocols are also based on an arbitrary existentially-unforgeable digital signature scheme (Key-Gen,S,V). In addition to the previously mentioned parameters (a security parameter $\lambda$, the number of clients $v$, the pool size N, and the number of keys per client n), there is a revocation parameter $\alpha$. We briefly denote these parameters as p=($\lambda$, $v$, $\alpha$, N, n).

Algorithm $KM_{start}$. This algorithm is run by server S. On input of parameter p, algorithm $KM_{start}$ operates as follows:

---

1. Set $(vk_\iota, sk_\iota)$ ρ KeyGen($1^\lambda$), for $\iota = 1, \ldots, N$.
2. Set dtb = $\{(vk_\iota, sk_\iota) | \iota = 1, \ldots, N\}$, krl = "nothing" and return: (dtb, krl).

---

Subprotocol $KM_{join}$. This subprotocol is run by server S and a client $C_i$, for i in $\{1, \ldots, v\}$, that intends to join the infrastructure, and, on input of (p, $ID_i$, dtb, krl), $KM_{join}$ operates as follows:

---

1. $C_i$ sends its join request to S
2. for $j = 1, \ldots, n$,
   S randomly chooses $\iota$ (i,j) in [N]
   S sends $(vk_{\iota\,(i,j)}, sk_{\iota\,(i,j)})$ to $C_i$
3. let $pF_i = \{vk_{\iota\,(i,j)} | j = 1, \ldots, n\}$ and $sF_i = \{sk_{\iota\,(i,j)} | j = 1, \ldots, n\}$
4. $C_i$ returns (($pF_i$, $sF_i$), krl), and S adds record (join; i; $pF_i$, $sF_i$) to dtb and returns: dtb.

---

Subprotocol $KM_{leave}$. This subprotocol is run by server S and a client $C_i$, for i in $\{1, \ldots, v\}$, that intends to leave the infrastructure. On input of (p, $ID_i$, dtb, krl), subprotocol $KM_{leave}$ operates as follows:

---

1. $C_i$ sends its leave request to S.
2. For $j = 1, \ldots, n$,
   S adds key $vk_{\iota\,(i,j)}$ to krl and chooses a replacement key $(vk'_{\iota(i,j)}, sk'_{\iota\,(i,j)})$ in dtb.
3. S adds to dtb record
   (leave; i; krl; $\{vk_{\iota\,(i,j)}\}^n_{j=1}$; c($vk'_{\iota\,(i,j)}, sk'_{\iota\,(i,j)})^n_{j=1}\})$
4. S computes (dtb, krl) ρ $KM_{revoke}$(p, dtb, krl; $vk_{\iota\,(i,j)}$), for $j = 1, \ldots, n$
5. S returns: (dtb, krl).

---

Subprotocol $KM_{revoke}$. This subprotocol is run by server S. On input of (p, dtb, krl), subprotocol $KM_{revoke}$ operates as follows:

---

1. If inp = (m, sig) then let sig = (s, vk).
2. If S finds in dtb a leave record (leave; i; krl; $\{vk_{\iota\,(i,j)}\}^n_{j=1}$; $\{vk'_{\iota\,(i,j)}, sk'_{\iota\,(i,j)}\}^n_{j=1}$) such that vk = $vk_{\iota\,(i,j)}$ for some j, then revocation of vk was due to a leave event and S will send $vk'_{\iota\,(i,j)}$ to each client asking to update vk; S adds an update record (update; i; vk; ($vk'_{\iota\,(i,j)}$, $sk'_{\iota\,(i,j)}$)) to dtb if S finds in dtb an attack record (attack; $vk_{\iota\,(i,j)}$; (m, sig)), such that $vk_{\iota\,(i,j)}$ = vk then revocation of vk was due to an attack event; S chooses replacement keys $(vk'_{\iota\,(i,j,t)}, sk'_{\iota\,(i,j,t)})$ ρ KeyGen($1^\lambda$), for $t = 1, \ldots, a$ and will send $(vk'_{\iota\,(i,j,t')}, sk'_{\iota\,(i,j,t')})$, for some randomly chosen t' in [a], to each client asking to update vk; S adds an update record (update; i; vk; $(vk'_{\iota\,(i,j,t)}, sk'_{\iota\,(i,j,t)})_{t\in[a]}$) to dtb
3. S returns: (dtb, krl).

Algorithms SIGN and VER. Algorithm SIGN is run by a client Ci, for i in [v], to protect the integrity and to authenticate the messages sent to other clients or to the server S. On input of parameter $1^\lambda$, the current key revocation list krl, a state value st in $\{\xi, (vk, sk)\}$, the files $pF_i$, $sF_i$ and a message m, algorithm SIGN operates as follows:

---

1. if st = (vk, sk) and vk $\overline{\omega}$ krl then $C_i$ computes s =Si(vk, sk, m), sig = (s, vk), returns: (sig; st) and halts;

2. if st = (vk, sk) and vk in krl then $C_i$ asks S to update key vk and halts;

3. if st = $\xi$ then $C_i$ randomly chooses j in [n], computes s =Si($vk_{\iota\,(i,j)}$, $sk_{\iota\,(i,j)}$, m), sets sig = (s, $vk_{\iota\,(i,j)}$), st = ($vk_{\iota\,(i,j)}$, $sk_{\iota\,(i,j)}$), returns: (sig, st) and halts.

---

Algorithm VER is run by a client $C_i$ or server S to verify the integrity and authenticity of received messages. On input of parameter $1^\lambda$, the current key revocation list krl, message m and signature sig, algorithm VER sets sig=(s, vk) and returns 0 if vk in krl, or V(vk, m, s) otherwise.

Algorithms DET and KTR. We do not formally describe algorithm DET as its checks depend on the application, but we require this algorithm, upon detection of a malicious message m, its associated signature sig and verification key vk, to update dtb with an appropriate record (attack; vk; (m, sig)).

Algorithm KTR is run by S to detect whether a given communication transcript signed using a signature public key is malicious or not. It takes as input p, q, dtb, an index i in [v], and a communication transcript containing q message/signature pairs ($m_k$, $sig_k$), where $sig_k$=($s_k$, $vk_k$), and for k=1, ... q, and where we assume without loss of generality that all message/signature pairs are malicious; that is, DET ($m_k$, $sig_k$)=1 for all k=1, ..., q. Formally, algorithm KTR operates as follows:

---

1. use records in dtb to compute a list $L_k \subseteq$ [v] of clients to which key $vk_k$ had been distributed and not revoked before $sig_k$ was sent 2. if i in $L_1 \cap ... \cap L_q$ then return: yes else return: no.

1. Recall that if KTR returns no, then we are sure that client $C_i$ did not generate these q signatures; however, if KTR returns yes, then we can at most infer that these q signatures were generated by one of the clients $C_i$ for which algorithm KTR(i, .) returns yes.

---

Proofs for the Main Construction: Correctness.

The correctness properties of SKI are easily seen to hold: the verification correctness follows from the analogue correctness property of the signature scheme (KeyGen,Si,Ve) used; the traceability correctness follows from the fact that the database dtb contains a record that any given key used by client $C_i$ to sign had actually been previously distributed to $C_i$ by S.

We now concentrate on proving the anonymity and traceability properties.

Proofs for the Main Construction: Anonymity Against a v-Candidate Attack.

We prove that SKI has satisfactory anonymity against a q-query, v-candidate and r-corruption attack. To prove this property, we would like to compute (an upper bound on) $\alpha$ in [0, 1] such that for any polynomial-time algorithm A, the experiment FAnonExp$^{SKI,A}$ returns 1 with probability $\alpha$+1/c.

While the outcome from queries of the types join, leave, sign in experiment FAnonExp$^{SKI,A}$ do not depend on the value of the index i in [v] that A is trying to guess, this is not the case for answers to attack queries, from which the adversary A can obtain a signature from $C_i$, and for revoke queries, where A can request a revocation of a key held by a corrupted client, which might (or not) change a key held by $C_i$. Recall that A's goal is to maximize $\alpha$; then, because of the mentioned distinction on the events, we note that it is convenient for A to choose only revoke or attack queries among its q queries in the experiment FAnonExp$^{SKI,A}$. Now, note that if A never uses revoke events, then it will only collect q signatures done using the same key randomly chosen by $C_i$ among its n|keys. In this simple attack strategy, A obtains $\alpha$|=E(Xi)=v|=1i(1i1=N)$^n$, where Xi is the random variable denoting the number of clients that share the same key used by $C_i$. Instead, A attempts the following (best possible) attack strategy. First of all, A can use revoke queries for keys that were held by corrupted parties in Corrupted. Here, A's hope is that a consequence of revoking any one of these keys will be the update of precisely the key vk that was used by $C_i$ in the last SIGN query in the attack sequence. Then, when signing the next message, $C_i$ will not choose vk, but randomly choose again a key among its current n keys (possibly choosing the replacement of key vk after the revoke event). If A cannot cause the revocation of vk (because none of its corrupted clients was assigned vk, then A just moves on to attack a different client Ci', for i' different from i. More formally, the best query sequence strategy for A goes as follows:

---

1. Set t = 0 and S0 = [v].
2. Randomly choose i in St.
3. Ask for a SIGN query from client $C_i$, and let vk be the key used to produce an answer to this query.
4. If vk is in pFj for some j in Corrupted, then
       ask for a revoke query on input key vk
           if q queries have been asked then halt, otherwise go to 3.
       else set St+1 =St \ {i}
5. Set t = t + 1.
6. If q queries have been asked then halt, otherwise go to 2.

---

Note that A's knowledge of dtb is needed to perform this query sequence strategy.

Now, recall the definition $Q_i=\{d: d \text{ is in } [ct], \text{VER}(1^\lambda, m_d, \text{sig}_d) = \text{DET}(m_d, \text{sig}_d) = 1, \text{KTR}(\beta, \text{dtb}, m_d, \text{sig}_d, i) = \text{yes}\}$, and let $s = \max(i \text{ in}[v]) |Q_i|$, where the queries are generated by A using the above strategy. For $k=1, \ldots, s$, in correspondence of the i-th SIGN query resulting in (mk,sigk), such that sigk=(sk, vkk), A can use records in dtb to compute a list Lk of candidate clients that were distributed vkk. Then, thanks to the probabilistic revocation strategy used, the probability that a client $C_j$ is in $L_t$, for a fixed $j \ne i$, also belongs to $L_1 \cap \ldots \cap L_t$, is at most $1/(a+1)^{s-1}$. Then, by a simple union bound, the number of clients $C_j$, for j in [v]\i such that Cj in $L \cap \ldots \cap Lt$, is at most $(v-1)n/N(a+1)^{s-1}$. We obtain that $\alpha \le N(a+1)^{s-1}/n(v-1)$. A non-trivial bound on S takes into account that s is increased by 1 whenever client Ci randomly chooses a key that is also shared with one of the r clients in Corrupted, which happens with probability $$\sum_{i=1}^{n}(rn/N)(1/n) = rn/N.$$

Thus, we have that $s \le 1/(1-rn/N) \le 2$, and we can conclude that $\alpha \le N(a+1)/n(v-1)$.

Proofs for the Main Construction: Traceability.

To prove the traceability property, we would like to compute (an upper bound on) τ in [0,1] such that for any polynomial-time algorithm A, the experiment FTrExp$^{SKI,A}$ returns 1 with probability τ. As for the anonymity property, we note that the queries join, leave in experiment FTrExp$^{SKI,A}$ do not affect our calculation of τ. Therefore, we can assume that A returns q pairs (mk, sigk), where sigk=(sk, vkk), for k=1, . . . , q, and each message mk is malicious and thus triggers an execution of KMrevoke.

Now, recall the definition Qi={d: d is in [ct], VER($1^\lambda$,md, sigd)=DET(md, sigd)=1, KTR($\beta$, dtb, md, sigd, i)=yes}, and consider the value i in S such that Qi is maximized. Note that A's goal is to maximize the probability that there exists j not in Corrupted such that Qj≥Qi. Therefore, we can compute an upper bound on τ as an upper bound on the probability that there exists j not in Corrupted such that count(j)>=count(i). Recall that, for k=1, . . . , q, in correspondence of the k-th SIGN event resulting in (mk, sigk), there exists a list Lk of candidate clients that were distributed vkk. Then, the probability that a client CJ not in Corrupted satisfies county)>= count(i), is the probability that Cj also belongs to Li1∩ . . . ∩ Lit, where t=counti and i1, . . . , it are such that Ci is in Li1∩ . . . ∩Lit. Thanks to the probabilistic update strategy used, this probability is at most $1/(a+1)^\tau$. Then the claim $\tau \le 1/(a+1)^{q/r}$ follows by using the simple lower bound $t \ge \Pi q/r$.

The inventive system requires a number of malicious messages from the malicious party to detect this party that is much smaller than the number of candidates. It does not sacrifice the level of anonymity or security already guaranteed by the scheme. This inventive system can be implemented as computer software or a computer readable program for operating on a computer. The computer program can be stored on computer readable medium.

While the present invention has been described in particular embodiments, it should be appreciated that the present invention should not be construed as limited by such embodiments, but rather construed according to the claims below.

What is claimed is:

1. A method for a signature key infrastructure enabling detection of one or more parties responsible for repeated malicious activities in secure and anonymous communication among a plurality of parties, the method comprising steps of:
   generating a pool of keys using a key-generation algorithm;
   distributing to and associating with each party of the plurality of parties a small number of keys chosen randomly from the pool of keys;
   revoking a key of the chosen keys when the key is detected as used in a malicious activity, and creating a first set of parties associated with the revoked key;
   revoking additional keys that are randomly chosen among the keys of the pool that are not currently revoked, and selecting new keys randomly and independently generated using the key-generation algorithm; and
   when a party requests an updated key, sending the updated key selected from among the new keys to the requesting party, wherein if an other malicious activity is detected, creating a second set of the parties associated with a malicious activity key of the other malicious activity and identifying the parties in both the first set and the second set, the step of identifying comprising making an intersection set comprising the parties in both the first set and the second set.

2. The method according to claim 1, further comprising repeating the steps of revoking the key, revoking additional keys, sending the updated key, creating the second set, and making the intersection set until only one party is in the intersection set.

3. The method according to claim 1, wherein number-c additional keys are revoked, where number-c is a small integer.

4. The method according to claim 3, wherein number-c1 new keys are independently generated, where the number-c1 is one greater than the number-c.

5. The method according to claim 4, wherein the number-c1 new keys replace the number-c keys.

6. A non-transitory computer readable medium having computer readable program code for operating on a computer for a signature key infrastructure enabling detection of one or more parties responsible for repeated malicious activities in secure and anonymous communication among a plurality of parties, the program comprising steps of:

generating a pool of keys using a key-generation algorithm;

distributing to and associating with each party of the plurality of parties a small number of keys chosen randomly from the pool of keys;

revoking a key of the chosen keys when the key is detected as used in a malicious activity, and creating a first set of parties associated with the revoked key;

revoking additional keys that are randomly chosen among the keys of the pool that are not currently revoked, and selecting new keys randomly and independently generated using the key-generation algorithm; and when a party requests an updated key, sending the updated key selected from among the new keys to the requesting party, wherein if an other malicious activity is detected, creating a second set of the parties associated with a malicious activity key of the other malicious activity and identifying the parties in both the first set and the second set, the step of identifying the parties comprises making an intersection set comprising the parties in both the first set and the second set.

7. The medium according to claim 6, further comprising repeating the steps of revoking the key, revoking additional keys, sending the updated key, creating the second set, and making the intersection set until only one party is in the intersection set.

8. The medium according to claim 6, wherein number-c additional keys are revoked, where number-c is a small integer.

9. The medium according to claim 8, wherein number-c1 new keys are independently generated, where the number-c1 is one greater than the number-c.

10. The medium according to claim 9, wherein the number-c1 new keys replace the number-c keys.

\* \* \* \* \*